Dec. 1, 1964    E. F. KNIGHT    3,159,366
HOLDER FOR A FISHING ROD
Filed Aug. 2, 1962
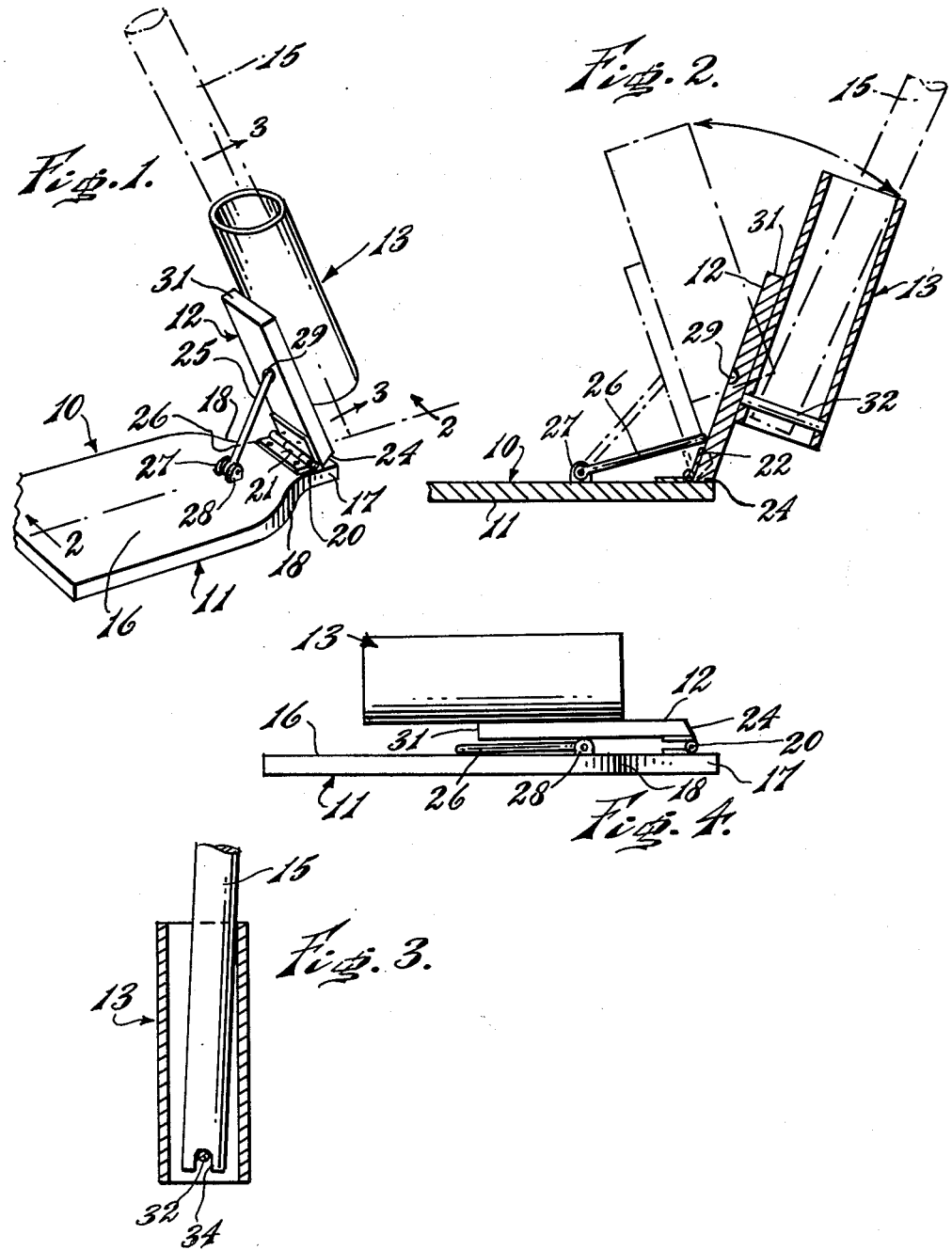
INVENTOR
Everett F. Knight
BY Robert K. Youtie
ATTORNEY 6 3,159,366
HOLDER FOR A FISHING ROD
Everett F. Knight, 144 Maple Ave., Westville, N.J.
Filed Aug. 2, 1962, Ser. No. 214,383
2 Claims. (Cl. 248—42)

This invention relates generally to fishing accessories, and is especially concerned with improvements in fishing-rod holding devices.

It is one object of the present invention to provide a holder for a fishing rod wherein a fisherman may conveniently fish in a sitting position from land, boat or a pier without the necessity for a fighting chair.

It is another object of the present invention to provide a fishing-rod holder of the type described which may be employed with any suitable chair or seat to convert the same to a fighting chair.

It is another object of the present invention to provide a fishing-rod holder for use in fishing from a boat, pier, or in surf fishing, wherein a rod and reel may be more easily manipulated, the device of the instant invention permitting of one-hand operation to facilitate for the handicapped.

It is still another object of the present invention to provide a fishing accessory having the advantageous characteristics mentioned in the preceding paragraphs, which is extremely simple in construction, durable and long-lasting in use, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a rear perspective view showing a fishing-rod holder constructed in accordance with the teachings of the present invention and in a rest position of use;

FIGURE 2 is a longitudinal sectional view taken generally along the line 2—2 of FIGURE 1, the holder being shown in solid lines in its operative condition of use, and in dashed outline in the rest position;

FIGURE 3 is a sectional view taken generally along the line 3—3 of FIGURE 1, and illustrating the fishing-rod holder and a rod in the rest position; and FIGURE 4 is a side elevational view showing the fishing-rod holder in a collapsed, nonuse condition, as for storage.

Referring now more particularly to the drawings, and specifically to FIGURES 1 and 2 thereof, the fishing accessory is there generally designated 10, and includes a generally flat base member or plate 11 to the forward region of which is hinged a swingable arm 12. The arm 12 carries a tubular receiver 13 for removably receiving the handle of a rod shown in phantom at 15.

The base 11 may be fabricated of wood, metal, plastic or other suitable material and may have a generally flat main portion or body 16 of generally rectangular configuration. Extending forward from the forward end of the body region 16 of base 11 may be an integral forward portion 17 of laterally reduced dimension, the forward portion preferably tapering smoothly from the body region 16, as between the converging side edges 18. In use, the body region 16 of base 11 rests on any suitable, generally horizontal supporting surface, such as the seat of a chair, a mound of sand, or otherwise, and the upper side of the body region 16 provides a seating surface for the user, with the reduced forward base portion 17 extending between the user's legs. It will thus be apparent that the base 11, by supporting the weight of a user, is firmly held in position during use.

The arm 12 may be of any suitable construction, and is shown as a generally rectangular board having a width approximately equal to that of the forward base extension 17, and arranged laterally coextensive with the latter having one end hinged thereto. That is, a hinge 20 has its pintle extending laterally of the forward base portion 17 and arm 12, one hinge leaf 21 being secured to the upper side of the base portion 17, and the other hinge leaf 22 being secured to the rearward side of the arm 12. The arm 12 is thereby pivotally connected to the forward base region 17 for forward and rearward swinging movement about the generally horizontal, laterally extending axis of hinge 20.

As shown in FIGURE 2, the arm 12 is swung to its forward limiting position, being inclined and extending forward from the forward base region 17. It will there be observed that the lower end 24 of the arm 12 is beveled or configured for abutting engagement with the upper surface of base region 17 to limit forward swinging movement of the arm to the illustrated operative position. In FIGURE 4 the arm 12 is shown in its collapsed position, having been swung rearwardly to extend generally horizontally overlying the base 11, while FIGURE 1 illustrates an intermediate or rest position of the arm 12, between the operative position of FIGURE 2 and collapsed position of FIGURE 4, with the arm being inclined inwardly or rearwardly and upwardly from the base.

In order to support the arm 12 in its rest position of FIGURE 1, suitable arm-holding means 25 is provided. The arm-holding means may include a rod or strut 26 having one end pivotally connected to the base 11, as by a pair of laterally spaced, upstanding ears 27 between which extends a pivot pin 28 passing through one end region of strut 26. The strut is thus swingable about the laterally extending, generally horizontal axis of pin 28 as between the collapsed, rearwardly extending condition of FIGURE 4, and the forwardly and upwardly inclined condition of FIGURE 1 with the upper or distal end of the pin in retaining engagement with the arm 11. Further, the arm may be provided on its rearward side with suitable formation, such as a recess 29, for receiving the upper end of strut 26 when the arm 12 is in its rest position. When the arm 12 is in its operative position of FIGURE 2, the strut 26 may remain forward against the arm 12, as shown, or may be swung rearward to its collapsed position of FIGURE 4.

The tubular rod-handle receiver 13 is fixed by any suitable means on the forward side of arm 12, extending longitudinally thereof and may project beyond the upper or outer end 31 of the arm. The receiver may consist of an open-ended tube and is provided in its lower region with a diametral engaging member, pin or rod 32. The engaging member or pin 32 is fixed in the tubular receiver 13 and may extend in a plane generally normal to the axis of hinge 20. The upper or outer end of receiver 13 is open for receiving the rod handle 15. The internal diameter of the receiver is advantageously appreciably greater than the diameter of the rod handle 15. This enables the rod to be inclined laterally, as seen in FIGURE 3, to extend over a user's shoulder when in the rest position. It will also be observed in FIGURE 3 that the handle end of the rod 15 is advantageously provided with a diametral groove 34 for receiving the diametral engaging member 32. This of course holds the rod 15 against rotation and permits singlehanded operation of a fishing reel on the rod.

While use and operation of the instant device is believed apparent from the foregoing description, it may be briefly reviewed as follows. When the device is not in use, the arm 12 may be swung rearward to a collapsed position closely overlying the base 11, the strut 26 previously being swung rearward out of the way. In this condition, the device is compact to occupy a minimum of space, and is easily carried and stored.

During operation, the arm 12 is swung to its outwardly inclined operative position of FIGURE 2 with the rod 15 supported in the receiver 13 and extending outwardly and upwardly therefrom, the entire device 10 and rod 15 being counterbalanced and firmly held in position by the weight of a user sitting on the base 11. When a strike occurs the rod 15, receiver 13 and arm 12 may be manipulated or worked as a unit and the fish subsequently reeled in.

When it is desired to bait the hook, or the like, the arm 12 may be swung to its rest position of FIGURE 1, and supported in the rest position by the strut 26. Also, the entire rod-holding device 10 and rod 15 will be self-standing in the rest position as the arm 12 and rod extend inwardly or rearwardly and upwardly to locate the gravitational center over the base 11. Hence, the assembly may remain unattended in its rest position.

From the foregoing, it is seen that the present invention provides a fishing-rod holding device which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A fishing rod and holder therefor comprising a generally flat base providing a seat for a user, an arm having one end hinged to the outer end of said base for swinging movement between a collapsed inward position overlying said base and an operative position inclined outwardly from said base, limit means limiting arm movement to said collapsed and operative positions, a strut having one end pivoted to said base intermediate the ends thereof for swinging movement between a collapsed position closely overlying said base and a forwardly inclined position for supporting engagement with said arm in an intermediate rest position with the arm inclined inwardly and upwardly from said base, a receiver arranged longitudinally of and carried by said arm, a rod insertable in said receiver, and interengaging means in said receiver and on said rod for nonrotative interengagement, whereby said arm is swingable between said operative and rest positions to move a received fishing rod between an operative outwardly inclined position and an inwardly inclined rest position, and whereby a reel carried by a received fishing rod is adapted to be operated by one hand of the user without rotation of the fishing rod.

2. A fishing rod and holder therefor according to claim 1, said interengaging means comprising a crosspin in said receiver, and a complementary formation on said rod.

References Cited in the file of this patent

UNITED STATES PATENTS

| | | |
|---|---|---|
| 1,985,985 | Gerline | Jan. 1, 1935 |
| 2,481,272 | Williams | Sept. 6, 1949 |
| 2,573,635 | Williams | Oct. 30, 1951 |
| 2,674,426 | Hiles | Apr. 6, 1954 |
| 2,734,555 | Kroner | Feb. 14, 1956 |
| 2,749,067 | Gorenflo | June 5, 1956 |
| 2,918,237 | Boesch | Dec. 22, 1959 |